Oct. 27, 1970    J. F. COLLETTI ET AL    3,536,940
FREE-FREE BEAM VIBRATOR
Filed Dec. 17, 1968
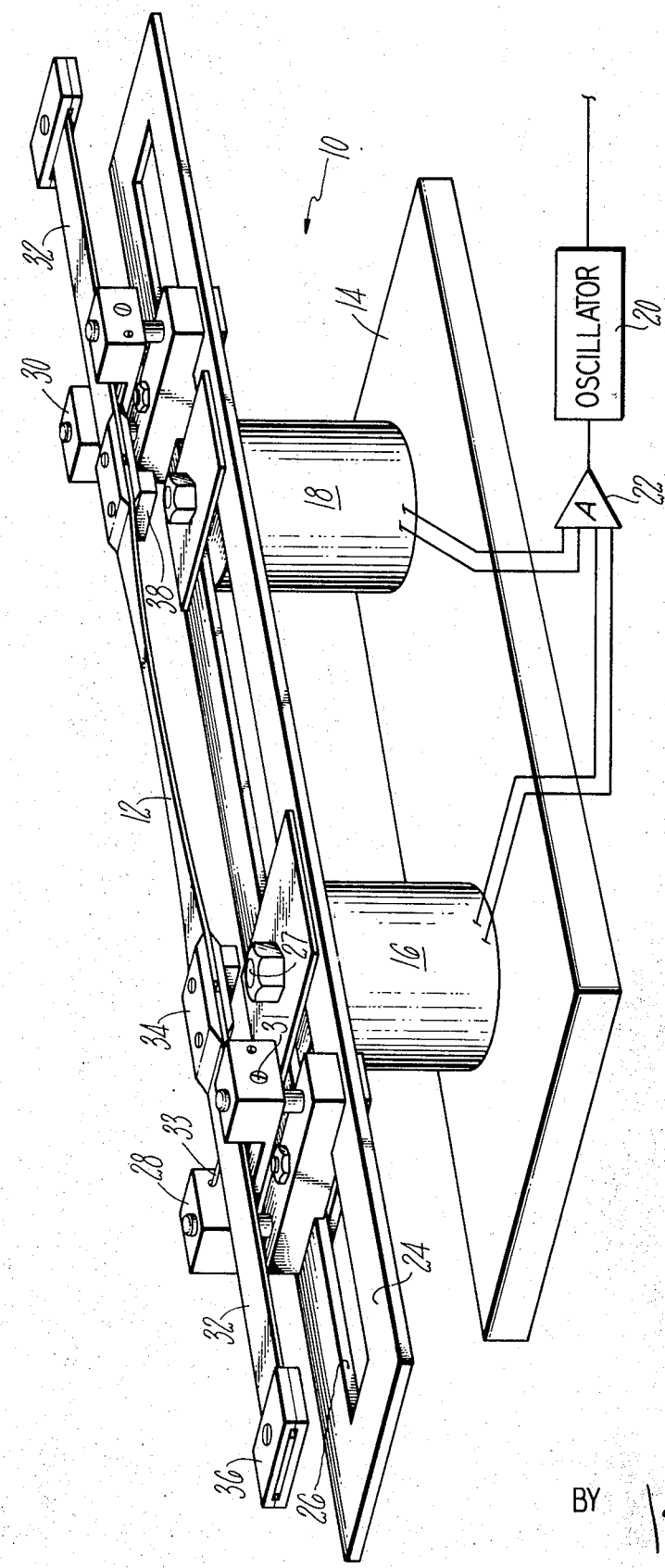
INVENTORS
JOSEPH F. COLLETTI
RICHARD F. BUGLI
BY
ATTORNEY

United States Patent Office 3,536,940
Patented Oct. 27, 1970

3,536,940
FREE-FREE BEAM VIBRATOR
Joseph F. Colletti, Thompsonville, Conn., and Richard F. Bugli, Willimansett, Mass., assignors to United Aircraft Corporation, East Hartford, Conn., a corporation of Delaware
Filed Dec. 17, 1968, Ser. No. 784,403
Int. Cl. H02k 33/14
U.S. Cl. 310—17
2 Claims

ABSTRACT OF THE DISCLOSURE

An electrodynamic beam vibrator system including a pair of trestles passively engaging the beam, the trestles supporting the beam at its nodal points so that it is maintained in a free-free mode, and a vibration excitor for inducing vibrations in the beam only.

BACKGROUND OF THE INVENTION

This invention relates to a means for inducing specimen bending fatigue and more particularly relates to an electrodynamic vibrator system for accurately inducing bending fatigue in fiber-reinforced composite materials.

It is known that most homogeneous materials may be fatigue tested in the form of cantilevered or rotating beam specimens where, through proper design, stresses in the retention region may be kept reasonably low and fractures can be made to occur in a controlled region free from retention effects. Fiber-reinforced composite materials however, do not lend themselves readily to testing by these accepted techniques. Specimens with uniaxial fiber orientation, for example, tend to fail in the retention region because of the characteristically low compressive strength of the matrix material. As a result, useful bending fatigue data on composite materials has heretofore been unavailable.

Apart from an inability to cope with the unique problems associated with testing fiber-reinforced composites, there are other shortcomings in conventional equipment which mitigate against its effectiveness in consistently testing materials regardless of their makeup. The prior art electrodynamic vibration generation systems have been characterized by the use of a driver coil, attached to a specimen-retaining table assembly, and operating in an air gap of high flux density. The vibration inducing equipment, was therefore, not only relatively complex, but also subjected along with the specimen to the detrimental effects of vibratory movement for extended periods of time. Because of the practical necessity of having a system with the ability to generate vibratory forces over a wide frequency spectrum, there is imposed on such a prior art system the severe and uneconomic requirement that the moving element assembly be both rugged and essentially resonance free within the operating frequency range.

SUMMARY OF THE INVENTION

The present invention pertains to a means for testing structural materials in bending fatigue and, more particularly, pertains to a process and apparatus for causing oscillations in a specimen without also inducing therein a region of artificial or unnatural stress such as that caused in conventional, positive grip systems. It contemplates the use of an electrodynamic vibrator as, for example, an electromagnetic vibration excitor in combination with a supporting structure for inducing in a speciment, as a free-free beam, a natural resonant mode of vibration.

In accordance with one aspect of the present invention, a pair trestle supports are provided in combination with an electromagnetic excitor to allow passive support of the beam at its nodal points so that the beam is maintained as a free-free beam with the supports being isolated from vibratory effects. The excitor includes a pair of vibration inducing electromagnets which are movable to sustain a beam in one of its natural resonant modes by the application of force in phase with the displacement at any point along the beam other than the nodal points. The system includes means to adapt non-magnetic specimens to the application of magnetic forces as well as means to compensate for any non-uniformity of specimen cross section.

BRIEF DESCRIPTION OF THE DRAWING

The drawing is a perspective view of typical apparatus adapted for the practice of the invention.

DESCRIPTION OF THE PREFERRED EMBODIMENTS

Referring now to the drawing, the numeral 10 designates, in general, the free-free beam vibrator which is uniquely effective in inducing bending fatigue of a composite specimen 12. The vibrator has a base plate 14 on which a pair of phase electromagnets 16, 18 are supported. The electromagnets are preferably provided with laminated, air cooled cores and are electrically connected to an oscillator 20 via an amplifier 22. Slidably supported on the shoulders of the electromagnets is a flat guide bar 24 having a central longitudinal slot 26. As can be seen in the drawing, the core 27 of the electromagnet projects upwardly through the slot 26. This slot not only permits adjustability of the electromagnets 16, 18 towards or away from one another but also slidably receives a pair of trestle supports 28, 30 on which the beam assembly rests. The trestles are adjustable vertically, such as by the adjustment screw 31, so that the distance between the specimen 12 and the electromagnet coil can be varied for optimum vibratory inducement. In order to prevent interference with specimen oscillation, the trestles are designed to make line, rather than area, contact with the beam assembly and this is accomplished by providing a taut wire or rubber cord 33 in the yoke-like portion of the trestles.

It should be noted at this point that the term specimen as used herein refers only to the material being tested and on which the bending fatigue data is being sought. The term beam, on the other hand, denotes that complete structure, whether it be an assemblage of components including the specimen or a unitary length of specimen material alone, which is supported, directly or indirectly, by the trestle supports and which is subjected to vibratory movement. The beam depicted in the drawing includes a pair of steel extension bars 32 clamped onto the end of the specimen 12 by means of fiberglass clamping strips 34. The extension bars are, of course, not necessary if the specimen is sufficiently long but they have proven very advantageous since they permit the use of shorter specimens without a consequent decrease in amplitude achievement. Removably secured to the outer end of each extension bar is a compensating tip weight 36 which is adjustable in a direction transverse to the axis of the specimen assembly. It has been found that in most cases the fiber content of a unidirectionally reinforced composite is either slightly misaligned so that all of the fibers are parallel to each other but not to the longitudinal axis of the specimen or the fibers are not loaded in a uniform manner so that they are not parallel to each other or both. In any case, the result is that when oscillations are induced and maintained by the external driving force, instead of a pure flexural vibration, there will exist characteristic torsional bending. By utilizing the adjustable tip weights 36, the torsional excitation is easily offset. The weights are preferably made of metal and should be limited in size so that they do not lower the natural resonance of the beam appreciably but must, of course, be heavy enough to compensate for the torsion effect. The location of the weights at the extremities of the extension bars is also advantageous in that it magnifies the bending moment on the specimen.

As seen in the drawing, a further adaptation that is made when a specimen is comprised of a non-magnetic material is the addition of magnetic pole pieces 38. The pole pieces are adhesively secured in place to the underside of the beam assembly at points located adjacent to its nodal points.

In operation, a composite specimen is prepared for fatigue testing by assembling it between the extension bars 32. A static calibration of the beam is made, in general, by centering the beam assembly over a pair of supports, imposing a predetermined weight force to the center of the specimen and recording the deflection. Following the static calibration, a dynamic calibration of the specimen is made. In general, this calibration requires a strain gage to be mounted on the exact center of the specimen so that when the assembly is placed with its nodal points on the trestles and the electromagnets are activated to a predetermined level, the resulting deflection at the center of the specimen is calibrated to the output of the strain gage. Since the stress is proportional to the amplitude, the calibrated deflection is used for monitoring all subsequent stress levels. This, of course, obviates the impracticality of employing a strain gage with its limited fatigue life as a method of stress level monitoring.

During fatigue testing, various procedures can be used. One preferred procedure in yielding cumulative damage in bending fatigue is to perform a continuing cycle of stress variation by sequentially higher levels of stress amplitude. Each level is run for a predetermined period, as for example 10 million cycles. When fracture occurs, the specimen experiences a diminution of stiffness and a noticeable drop in resonant frequency is detected. If no noticeable shift in resonant frequency is detectable, fatigue is determined by subjecting the assembly to a second static test. An increase in static deflection can be interpreted as matrix cracking or crazing which is not discernable by macroexamination.

In one investigation, a Thornel-epoxy system was tested. The specimen was unidirectionally reinforced with a 50% volume fraction of the carbon fibers. It was 16 layers thick and the specimen measured 8 inches in length with a .75 inch width at its ends tapering to a .375 inch width at its center. The specimen was run for 10 million cycles at successive levels of 50,000 and 60,000 p.s.i. without fracture occurrence. At the third level, 70,000 p.s.i., fracture occurred after approximately 4 million cycles.

Similar testing has provided useful data on boron-aluminum composites and it can be seen that accurate bending fatigue data can be compiled for any composite system regardless of its makeup. The instant invention provides an excitation system which induces a fundamental sinusoidal vibration in a specimen as a part of a free-free beam. Not only does the beam have its ends free, but it is also free from any positive restraints. The beam, as indicated, is merely placed on the trestles and borne there. It is not positively gripped or clamped at all. The apparatus fulfills a retentive function by providing what can be characterized as passive support at the nodal points of the beam. Furthermore, the only moving part in the apparatus is the beam assembly. The vibration inducing equipment, except for the magnetic pole pieces when they are used, is completely stationary and the stability of the apparatus is thus enhanced with the possibility of malfunction or damage during use being greatly reduced.

In the practice of the present invention, it is recognized that several modifications can be made. It is recognized, for example, that the slotted bar 24 could be eliminated if the trestles were supported directly on the base plate. As long as they are vertically and laterally adjustable to support the specimen assembly at its nodal points and to optimize the specimen distance to the electromagnets, the basic advantages of the operation are retained. It is also recognized that the apparatus can be made into a self-exciting system through electronic feedback techniques.

It will be readily seen that, through the use of the techniques hereinbefore described, specimen materials can readily and accurately provide bending fatigue data.

What is claimed is:

1. In an electrodynamic vibrator system for producing forced vibrations in a beam, the improvement which comprises:

a pair of trestles passively bearing said beam to render support at the nodal points of the beam so that it is maintained in an unclamped free-free mode;

vibration exciter means adjacent said trestle for converting electrical energy into vibratory forces acting on the beam at points other than said nodal points, said excitor means including a pair of electromagnets;

said trestles and said exciter means being adjustable with respect to each other and with respect to the beam; and adjustable weights provided on opposite ends of the beam to compensate for torsional bending in said beam, whereby said trestles are isolated from said vibratory forces.

2. In a process for electrodynamically vibrating a beam in flexure, the improvement which comprises placing said beam on a pair of supporting trestles, said trestles being in registry with the nodal points of said beam so that said beam is supported as an unclamped free-free beam, electromagnetically inducing selected vibratory stress levels on said beam and compensating for torsional bending in the beam.

References Cited

UNITED STATES PATENTS

| | | | |
|---|---|---|---|
| 2,249,649 | 7/1941 | Fielding | 73—67.4 |
| 1,543,124 | 6/1925 | Ricker | 73—67.2 XR |
| 2,336,930 | 12/1943 | Dyer. | |
| 3,176,505 | 4/1965 | Hendrickson | 73—67.2 |
| 2,361,396 | 10/1944 | Gross | 73—67.4 |
| 2,171,303 | 8/1939 | De Forest | 73—67.4 |

FOREIGN PATENTS

| | | |
|---|---|---|
| 1,011,472 | 1965 | Great Britain. |
| 397,167 | 1933 | Great Britain. |
| 928,689 | 1947 | France. |
| 1,108,189 | 4/1968 | Great Britain. |

MILTON O. HIRSHFIELD, Primary Examiner

B. A. REYNOLDS, Assistant Examiner

U.S. Cl. X.R.

73—67; 310—29